United States Patent
Liu et al.

(10) Patent No.: US 12,045,137 B2
(45) Date of Patent: Jul. 23, 2024

(54) DATA BACKUP METHOD, APPARATUS, AND SYSTEM

(71) Applicant: HUAWEI TECHNOLOGIES CO., LTD., Guangdong (CN)

(72) Inventors: Jipeng Liu, Chengdu (CN); Lei Zhang, Chengdu (CN); Gaoding Fu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 221 days.

(21) Appl. No.: 17/362,046

(22) Filed: Jun. 29, 2021

(65) Prior Publication Data
US 2021/0326211 A1   Oct. 21, 2021

Related U.S. Application Data

(63) Continuation of application No. PCT/CN2018/125779, filed on Dec. 29, 2018.

(51) Int. Cl.
*G06F 16/20*   (2019.01)
*G06F 11/14*   (2006.01)
(Continued)

(52) U.S. Cl.
CPC ...... *G06F 11/1451* (2013.01); *G06F 11/1461* (2013.01); *G06F 13/20* (2013.01); *G06F 16/2365* (2019.01); *G06F 2201/84* (2013.01)

(58) Field of Classification Search
None
See application file for complete search history.

(56) References Cited

U.S. PATENT DOCUMENTS

| 6,643,795 B1 | 11/2003 | Sicola et al. |
| 6,915,316 B1 | 7/2005 | Patterson et al. |

(Continued)

FOREIGN PATENT DOCUMENTS

| CN | 1770114 A | 5/2006 |
| CN | 103064763 A | 4/2013 |

(Continued)

OTHER PUBLICATIONS

Chen Kang et al.,"Hard Disk Data Recovery Instrument Design Based on FPGA",Journal of Guizhou University (Natural Science Edition), vol. 27 No. 2, Apr. 2010, with an English abstract,total 5 pages.

*Primary Examiner* — Jau Shya Meng
(74) *Attorney, Agent, or Firm* — HUAWEI TECHNOLOGIES CO., LTD.

(57) ABSTRACT

In a data backup method performed in a storage system having multiple storage devices, a first storage device having a first LUN queries data consistency points from a second storage device that has a second LUN which has an active-active relationship with the first LUN. The second storage device obtains the data consistency points based on the IO data status record of the first LUN and an IO data status record of the second LUN stored in the second storage device, and provides the data consistency points to the first storage device. The first storage device then creates a snapshot for the first LUN based on the data consistency points, provides differential data between the current snapshot and a previous snapshot, and stores the differential data in the backup storage device.

17 Claims, 11 Drawing Sheets

(51) Int. Cl.
    *G06F 13/20*     (2006.01)
    *G06F 16/23*     (2019.01)

(56) References Cited

U.S. PATENT DOCUMENTS

| | | |
|---|---|---|
| 8,250,031 B2 | 8/2012 | Kawaguchi |
| 9,116,737 B2 * | 8/2015 | Aswathanarayana ........................ G06F 11/1448 |
| 9,460,028 B1 | 10/2016 | Raizen et al. |
| 10,423,493 B1 * | 9/2019 | Vig .................... G06F 11/1451 |
| 11,537,480 B1 * | 12/2022 | Sergeev ............. G06F 11/1451 |
| 2008/0256141 A1 | 10/2008 | Wayda et al. |
| 2008/0281877 A1 | 11/2008 | Wayda et al. |
| 2010/0191884 A1 * | 7/2010 | Holenstein .......... G06F 16/2343     707/613 |
| 2011/0082991 A1 | 4/2011 | Leman et al. |
| 2018/0157421 A1 | 6/2018 | Brown et al. |
| 2020/0159413 A1 * | 5/2020 | Seal ................... G06F 11/1451 |

FOREIGN PATENT DOCUMENTS

| | | |
|---|---|---|
| CN | 105677506 A | 6/2016 |
| CN | 105868053 A | 8/2016 |
| CN | 106776147 A | 5/2017 |
| CN | 106852174 A | 6/2017 |
| CN | 107122263 A | 9/2017 |
| CN | 107220104 A | 9/2017 |
| EP | 3862883 A1 | 8/2021 |
| WO | 2011154164 A1 | 12/2011 |

* cited by examiner

DATA BACKUP METHOD, APPARATUS, AND SYSTEM

CROSS-REFERENCE TO RELATED APPLICATIONS

This application is a continuation of International Application PCT/CN2018/125779, filed on Dec. 29, 2018, the disclosure of which is hereby incorporated by reference in its entirety.

TECHNICAL FIELD

This application relates to the field of storage technologies, and in particular, to a data backup method, an apparatus, and a system.

BACKGROUND

Active-active LUNs are LUNs in two sets of physically independent storage. By configuring an active-active relationship, two independent LUNs are associated as one logical LUN, and the two physical LUNs have a same identifier, e.g. a world wide name (WWN). When a service host uses the active-active LUNs, provided that the service host recognizes the LUN identifier (WWN) and reads/writes data based on the LUN identifier (WWN), an LUN driver layer distributes read/write requests to the two physical LUNs according to a specific load balancing policy.

To continue backup when a storage fault occurs at one end, a backup administrator separately configures a backup policy in the two sets of storage. Because the two sets of storage have completely the same data, backup data is redundant to a great extent.

SUMMARY

This application provides a data backup method, applied to a storage system. The storage system includes a first storage device, a second storage device, and a backup storage device, a first logical unit LUN is constructed in the first storage device, a second logical unit LUN is constructed in the second storage device, and the first LUN and the second LUN are set to be in an active-active relationship. The method includes: when initiating backup for the first LUN, sending, by the first storage device, a request message for querying data consistency points to the second storage device to which the second LUN belongs, where the request message includes an IO data status record of the first LUN, and the IO data status record is used to record IO that is saved to storage in the first LUN; receiving information about data consistency points that is obtained by the second storage device based on the IO data status record of the first LUN and an IO data status record that is of the second LUN and that is stored in the second storage device; and creating a snapshot for the first LUN based on the data consistency points, and providing differential data between the current snapshot and a previous snapshot, where the differential data is written into a backup image that is created for the current backup in the backup storage device.

This application provides a data backup method, applied to a storage system. The storage system includes a first storage device, a second storage device, and a backup storage device, a first LUN is constructed in the first storage device, a second LUN is constructed in the second storage device, and the first LUN and the second LUN are set to be in an active-active relationship. The method includes: when initiating backup for the first LUN, hanging, by the first storage device, IO from a host, and writing, into a hard disk, written IO previously cached in the first storage device; sending, by the first storage device, a notification message to the second storage device when hanging the IO from the host, where the notification message is used to instruct to hang IO from the host and create a snapshot; and receiving a snapshot identifier returned by the second device, saving, to storage, the written IO previously cached in the first storage device, creating, by the first storage device, a snapshot for the first LUN, creating a backup image of the current backup in the backup storage device, and writing differential data between the current snapshot and a previous snapshot into the backup image.

This application further provides a storage system. The storage system includes a first storage device, a second storage device, and a backup storage device, a first logical unit LUN is constructed in the first storage device, a second logical unit LUN is constructed in the second storage device, and the first LUN and the second LUN are set to be in an active-active relationship.

The first storage device is configured to: when initiating backup for the first LUN, send a request message for querying data consistency points to the second storage device to which the second LUN belongs, where the request message includes an IO data status record of the first LUN, and the IO data status record is used to record IO that is saved to storage in the first LUN; receive a response message that includes information about data consistency points and that is returned by the second storage device; and create a snapshot for the first LUN based on the data consistency points.

The first storage device is further configured to: receive a request for querying differential data, and return corresponding differential data based on the request, where the differential data is written into a backup image that is created for the current backup in the backup storage device. The second storage device is configured to: receive the request message for querying data consistency points, obtain the information about the data consistency points based on the IO data status record of the first LUN and an IO data status record that is of the second LUN and that is stored in the second storage device, and return the response message to the second storage device.

The backup storage device is configured to provide the backup storage image.

According to another aspect, this application further provides a storage device. At least one LUN is disposed in the storage device, the at least one LUN includes a first LUN, the first LUN and a second LUN in another storage device are set to be in an active-active relationship, and the storage device includes a dual-ended consistency snapshot apparatus.

The dual-ended consistency snapshot apparatus is configured to: when initiating backup for the first LUN, send a request message for querying data consistency points to the second storage device to which the second LUN belongs, where the request message includes an IO data status record of the first LUN, and the IO data status record is used to record IO that is saved to storage in the first LUN; receive a response message that includes information about data consistency points and that is returned by the second storage device; and create a snapshot for the first LUN based on the data consistency points.

The first LUN is configured to: receive a request for querying differential data, and return corresponding differential data based on the request, where the differential data is written into a backup image that is created for the current backup in the backup storage device.

An embodiment of the present invention further provides a storage device. The storage device includes a network interface 2100, a processor 2102, a memory 2104, a storage interface 2106, and a storage array 2108. The foregoing first LUN is disposed based on the storage array 2108. The network interface 2100, the processor 2102, the memory 2104, and the storage interface 2106 are connected to each other by using a bus. The storage interface and the storage array are communicatively connected to each other. The network interface 2100 may be provided by one or more network interface cards (Network Interface Card) and is configured to access a network. The storage interface 2106 is configured to connect to the storage array 2108. The storage array 2108 is configured to store data. The storage array 2108 may alternatively be replaced with another storage device. The memory 2104 stores some program instructions. These instructions are used to implement the foregoing function of the storage device when being executed by the processor 2102.

An embodiment of present invention further provides a storage medium. The storage medium stores the foregoing program instructions.

BRIEF DESCRIPTION OF DRAWINGS

FIG. 2-1 is a schematic diagram of a storage device according to an embodiment of the present invention;

FIG. 3-1 to FIG. 3-7 are schematic diagrams of a data changing process according to an embodiment of the present invention.

DESCRIPTION OF EMBODIMENTS

Figure 1:
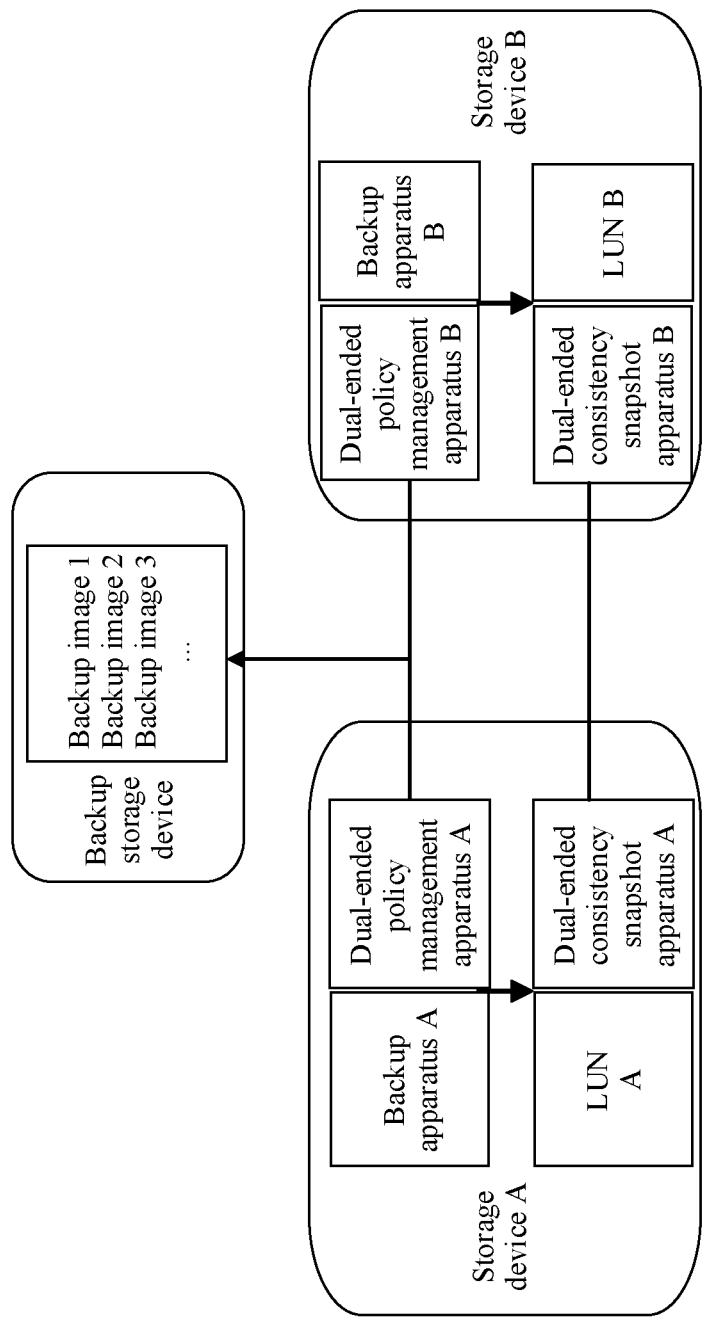
FIG. 1 is a schematic networking diagram of a data backup system according to an embodiment of the present invention.

Embodiments of the present invention provide a data backup system configured to back up data in a storage device. As shown in FIG. 1, the data backup system includes a storage device A, a storage device B, and a backup storage device, and the storage device A and the storage device B are physically independent of each other. A logical unit LUN A is constructed in the storage device A, a LUN B is constructed in the storage device B, and the LUN A and the LUN B are configured to be in an active-active relationship. It may be understood that in actual networking, more LUNs may be configured in each of the storage device A and the storage device B. For ease of description, one LUN is used as an example for description in this embodiment of the present invention. For ease of description, in the following device and system embodiments, the storage device A is referred to as a first storage device, the storage device B is referred to as a second storage device, the LUN A is referred to as a first LUN, and the LUN B is referred to as a second LUN.

The first storage device is configured to: when initiating backup for the first LUN, send a request message for querying data consistency points to the second storage device to which the second LUN belongs, where the request message includes an IO data status record of the first LUN, and the IO data status record is used to record IO that is saved to storage in the first LUN; receive a response message that includes information about data consistency points and that is returned by the second storage device; and create a snapshot for the first LUN based on the data consistency points. The first storage device is further configured to: receive a request for querying differential data, and return corresponding differential data based on the request, where the differential data is written into a backup image that is created for the current backup in the backup storage device.

The second storage device is configured to: receive the request message for querying data consistency points, obtain the information about the data consistency points based on the IO data status record of the first LUN and an IO data status record that is of the second LUN and that is stored in the second storage device, and return the response message to the second storage device.

The backup storage device is configured to provide the backup storage image.

At least one LUN is disposed in the first storage device, the at least one LUN includes a first LUN, and the first LUN and a second LUN in another storage device (the second storage device) are set to be in an active-active relationship.

The first storage device further includes a dual-ended consistency snapshot apparatus. The dual-ended consistency snapshot apparatus is configured to: when initiating backup for the first LUN, send a request message for querying data consistency points to the second storage device to which the second LUN belongs, where the request message includes an IO data status record of the first LUN, and the IO data status record is used to record IO that is saved to storage in the first LUN; receive a response message that includes information about data consistency points and that is returned by the second storage device; and create a snapshot for the first LUN based on the data consistency points.

The first LUN is configured to: receive a request for querying differential data, and return corresponding differential data based on the request, where the differential data is written into a backup image that is created for the current backup in the backup storage device.

Optionally, the IO data status record includes an identifier of an LUN that receives IO from a host and a sequence number of the IO received from the host. The dual-ended consistency snapshot apparatus is further configured to receive a request message for querying data consistency points, where the request message is from the second storage device to which the second LUN belongs and the request message includes an IO data status record of the second LUN, and the IO data status record is used to record IO that is saved to storage in the second LUN.

The dual-ended consistency snapshot apparatus is further configured to: determine, based on the IO data status record that is of the first LUN and that is stored in the storage device and the IO data status record of the second LUN, IO that has been saved to storage in both the first storage device and the second storage device in IO written into the first LUN by the host, and use a latest sequence number of the determined IO as a first data consistency point; and determine, based on the IO data status record of the first LUN and the IO data status record of the second LUN, IO that has been saved to storage in both the second storage device and the first storage device in IO written into the second LUN by the host, and use a latest sequence number of the determined IO as a second data consistency point, where the data consistency points include the first data consistency point and the second data consistency point.

Optionally, as shown in FIG. 1, when the backup system has no gateway, the storage device further includes a dual-ended policy management apparatus and a backup apparatus. The backup apparatus is configured to: receive a backup policy creation request, and forward the backup policy creation request to the dual-ended policy management apparatus, where the backup policy creation request is used to create a backup policy.

The dual-ended policy management apparatus is configured to set a dual-ended backup policy based on the active-active relationship between the first LUN and the second LUN, where the dual-ended backup policy includes a first backup policy applicable to the first LUN and a second backup policy applicable to the second LUN. The dual-ended policy generates a backup task for the first LUN based on the first backup policy.

Optionally, the dual-ended policy management apparatus is specifically configured to: determine, based on the first data consistency point and the second data consistency point, a sequence number of written IO included in the current snapshot, create a snapshot volume, search the IO data status record of the first LUN and the IO data status record of the second LUN for corresponding data based on the sequence number of the written IO, and write the found data into the snapshot volume.

Figure 2:
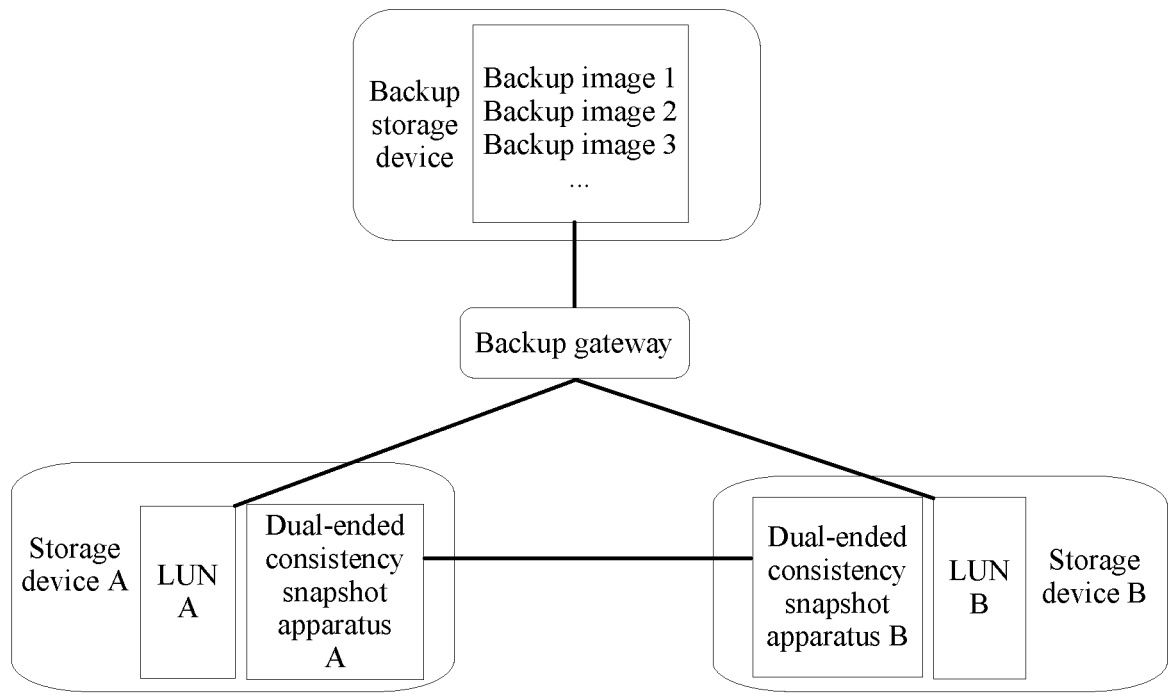
FIG. 2 is a schematic networking diagram of another data backup system according to an embodiment of the present invention.
Figures 1, 2:
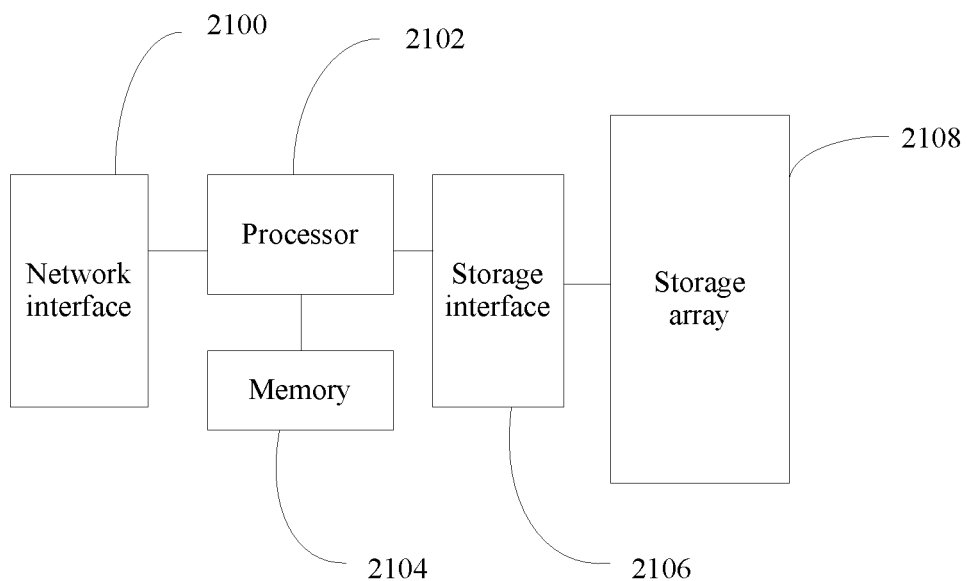

Referring to FIG. 2-1, an embodiment of the present invention further provides a storage device. The storage device includes a network interface 2100, a processor 2102, a memory 2104, a storage interface 2106, and a storage array 2108. The foregoing first LUN is disposed based on the storage array 2108. The network interface 2100, the processor 2102, the memory 2104, and the storage interface 2106 are connected to each other by using a bus. The storage interface and the storage array are communicatively connected to each other. The network interface 2100 may be provided by one or more network interface cards (Network Interface Card) and is configured to access a network. The storage interface 2106 is configured to connect to the storage array 2108. The storage array 2108 is configured to store data. The storage array 2108 may alternatively be replaced with another storage device. The memory 2104 stores some program instructions. These instructions are used to implement the foregoing function of the storage device when being executed by the processor 2102.

Figure 3A:
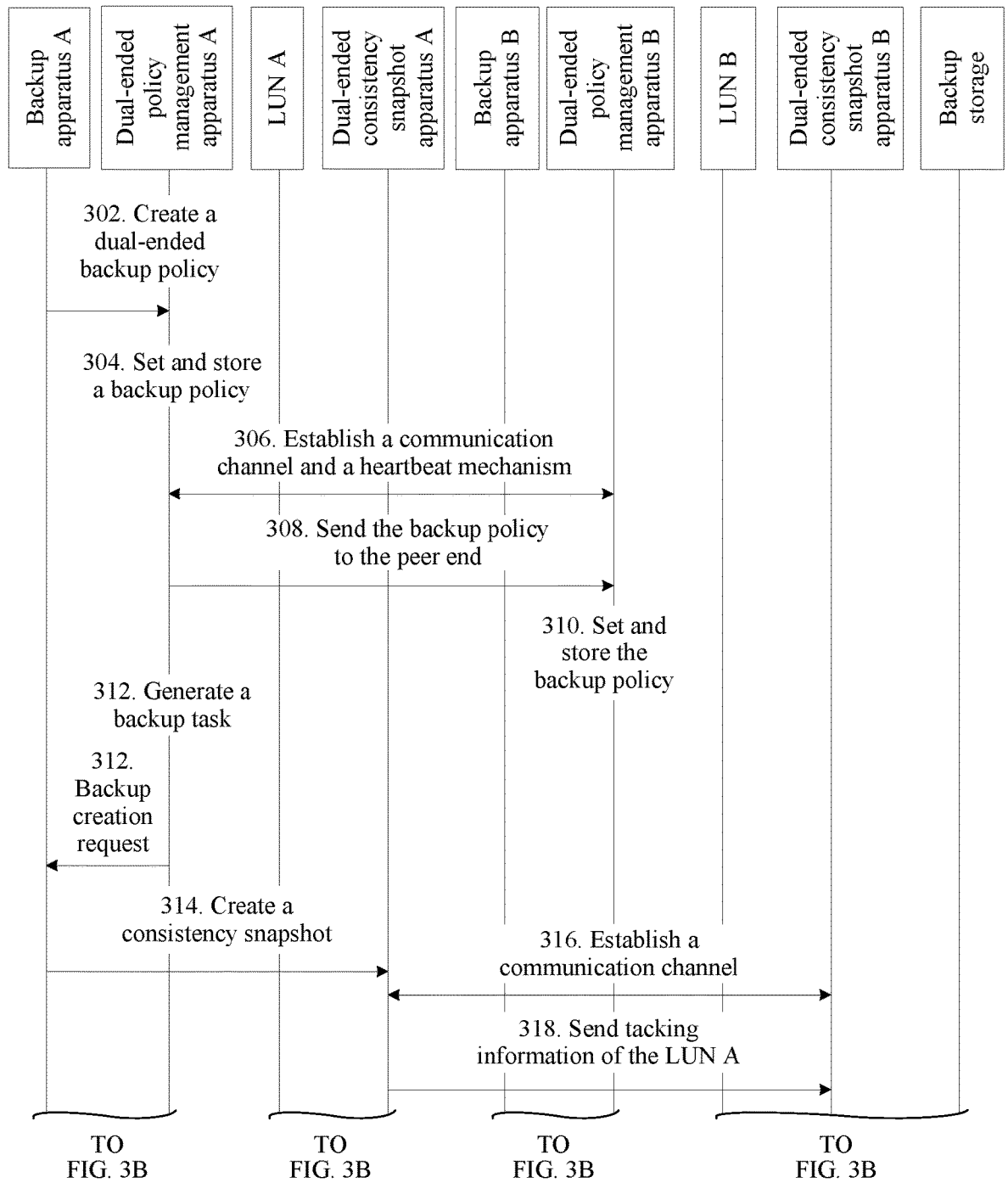
FIG. 3A and FIG. 3B are a schematic flowchart of a data backup method according to an embodiment of the present invention.
Figure 3B:
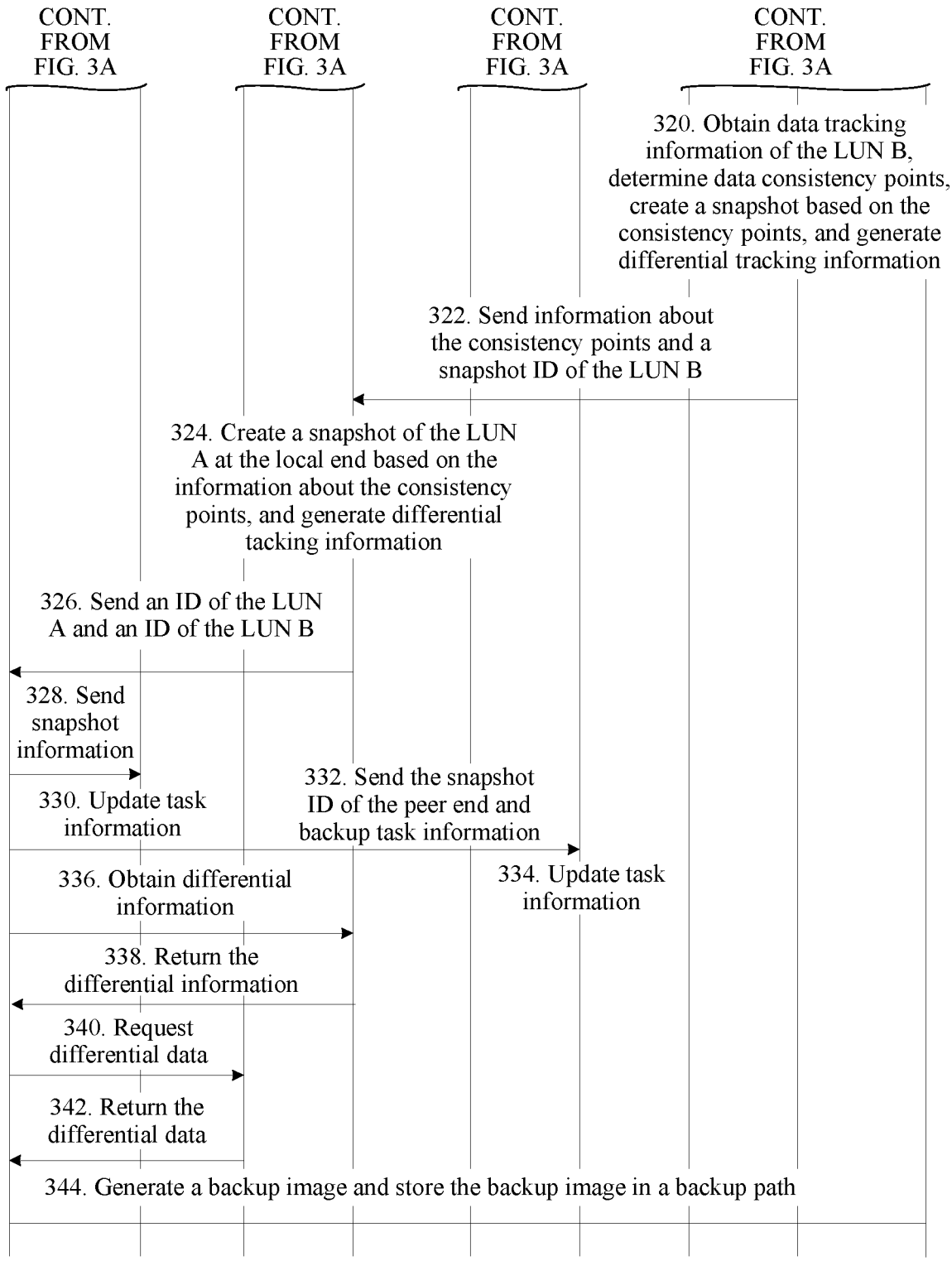

Referring to FIG. 3A and FIG. 3B, an embodiment of the present invention provides a data backup method, applied to the data backup system in FIG. 1. A LUN A in a storage device A and a LUN B in a storage device B form a pair of active-active LUNs. A backup administrator usually creates a backup policy by using a backup apparatus A or a backup apparatus B. In this embodiment, an example in which the backup administrator creates the backup policy by using the backup apparatus A is used for description.

Step 302: The backup apparatus A receives a backup policy creation request sent by the backup administrator, and forwards the backup policy creation request to a dual-ended policy management apparatus A, where the backup policy creation request is used to request to create a backup policy. The backup policy creation request includes a device identifier, an identifier of a backup object that needs to be backed up, information about a backup storage device, and the backup policy.

Specifically, in this step, the backup apparatus A receives the backup policy creation request, and therefore the device identifier includes an IP address and a port number of the storage device A. The backup object that needs to be backed up is the LUN A, and therefore identification information of the backup object that needs to be backed up is an ID of the LUN A. The information about the backup storage device includes an IP address of the backup storage device, a port number of the backup storage device, and a storage path of backup data. The backup policy may be a backup trigger cycle, for example, performing backup each hour, or may be another policy; and may be set based on an actual requirement.

A peer end is the storage device B, and an identifier of the peer end includes an IP address of the peer end and a port number of a listening port of the peer end.

Step 304: The dual-ended policy management apparatus A sets a dual-ended backup policy based on the received backup policy creation request, and locally stores the dual-ended backup policy.

The dual-ended policy management apparatus A finds that the LUN A is configured in an active-active relationship and the LUN B is paired with the LUN A, and therefore the dual-ended policy management apparatus A sets the dual-ended backup policy. The dual-ended backup policy includes information about a policy that needs to be performed for the LUN A (for ease of description, referred to as a first backup policy below), and information about a policy that needs to be performed for the LUN B (for ease of description, referred to as a second backup policy below).

The first backup policy includes an identifier of the storage device A, the identifier (ID) of the LUN A, an identifier and a backup path (/backup/) of the backup storage device, and a time (for example, 1 o'clock, 3 o'clock, 5 o'clock, 7 o'clock, 9 o'clock, 11 o'clock, . . . ) at which backup is performed for the LUN A. The time may be configured flexibly based on different settings of the administrator, and merely one example is used herein. The second backup policy includes an identifier of the storage device B, an identifier of the LUN B, the identifier and the backup path (/backup/) of the backup storage device, and a time (for example, 2 o'clock, 4 o'clock, 6 o'clock, 8 o'clock, 10 o'clock, 12 o'clock, . . . ) at which backup is performed at the peer end. In this embodiment of the present invention, a world wide name (WWN) is used as an ID of each of the LUN B and the LUN A. The LUN A and the LUN B are set to be in the active-active relationship, and therefore have a same WWN.

Optionally, after step 304, the dual-ended policy management apparatus A may return a response message to the backup apparatus A, to indicate that the backup policy has been set.

Step 306: The dual-ended policy management apparatus A establishes a communication channel and a heartbeat mechanism with a dual-ended policy management apparatus B.

The dual-ended policy management apparatus A sends a heartbeat to the dual-ended policy management apparatus B; and if the dual-ended policy management apparatus A does not receive a heartbeat of the dual-ended policy management apparatus B within a specified time (for example, 2 minutes), the dual-ended policy management apparatus A considers that the storage device B is faulty.

Step 308: The dual-ended policy management apparatus A sends the first backup policy and the second backup policy to the dual-ended policy management apparatus B by using the communication channel.

Step 310: The dual-ended policy management apparatus B receives the backup policy from the dual-ended policy management apparatus A, and locally stores the backup policy.

The dual-ended policy management apparatus B receives the first backup policy and the second backup policy, and can determine, based on an identifier of the backup apparatus in the first backup policy and the second backup policy, that a backup policy of the local end is the second backup policy and a backup policy of the peer end is the first backup policy.

Step 312: The dual-ended policy management apparatus A schedules the backup policy, generates a backup task, and sends a backup creation request to the backup apparatus A. The backup creation request includes an identifier (ID) of the backup task.

In this embodiment of the present invention, an example in which the dual-ended policy management apparatus A invokes the first backup policy is used. Alternatively, when a condition in the second backup policy is met, for example, the time is 2 o'clock, the dual-ended policy management apparatus B may invoke the backup policy of the local end and send a backup creation request to the backup apparatus B.

Step 314: After receiving the backup creation request, the backup apparatus A sends a consistency snapshot creation request message to the dual-ended consistency snapshot apparatus A. The consistency snapshot creation request message includes the ID of the LUN A.

Step 316: The dual-ended consistency snapshot apparatus A establishes a communication channel with the dual-ended consistency snapshot apparatus B, where the communication channel is used by the dual-ended consistency snapshot apparatus A and the dual-ended consistency snapshot apparatus B to send a message to each other during communication.

In this step, the dual-ended consistency snapshot apparatus A can find, based on the active-active relationship, the dual-ended consistency snapshot apparatus B corresponding to the LUN B, and establish the communication channel with the dual-ended consistency snapshot apparatus B. Optionally, in this step, the communication channel established in step 306 may be reused, to send a message.

Step 318: The dual-ended consistency snapshot management apparatus A obtains an IO data status record of data of the LUN A, and sends the IO data status record to the dual-ended consistency snapshot apparatus B.

The IO data status record is mainly used to describe the data written into the LUN A, and the IO data status record includes a sequence number of IO received from a host and an identifier of an initiate end.

Step 320: The dual-ended consistency snapshot apparatus B obtains an IO data status record of data of the LUN B, finds data consistency points based on the received IO data status record of the data of the LUN A and the IO data status record of the data of the LUN B, generates information about the data consistency points, creates a snapshot based on the data consistency points, and generates differential tacking information.

Step 322: The dual-ended consistency snapshot apparatus B returns the information about the data consistency points and a snapshot ID of the LUN B to the dual-ended consistency snapshot apparatus A.

Step 324: After receiving the information about the data consistency points that is returned by the dual-ended consistency snapshot apparatus B, the dual-ended consistency snapshot apparatus A creates a snapshot of the LUN A at the local end based on the information about the data consistency points, and generates differential tracking information.

Step 326: The dual-ended consistency snapshot apparatus A returns a snapshot ID of the LUN A and the received snapshot ID of the LUN B to the backup apparatus A.

Step 328: The backup apparatus A generates a backup image ID of the current backup, and sends information about the current backup task to the dual-ended policy management apparatus A, where the information about the current backup task includes the LUN ID of the LUN A, the snapshot ID of the LUN A, the backup task ID of the current backup, and the backup image ID of the current backup.

Step 330: The dual-ended policy management apparatus A stores the received LUN ID of the LUN A, the received snapshot ID of the LUN A, the received backup task ID, and the received backup image ID in the storage device A.

It may be understood that the current backup is initiated by the storage device A, and therefore the dual-ended policy management apparatus A may classify the foregoing information as backup task information of the LUN A.

Step 332: The backup apparatus A sends the backup task information and snapshot information of the LUN B to the dual-ended policy management apparatus B.

Step 334: The dual-ended policy management apparatus B stores, in the backup task information of the LUN A, the LUN ID of the LUN B, the snapshot ID of the LUN B, a backup task ID, a backup image ID, and other task information that are in the storage device B.

Because the two ends correspond to the same backup task and a same backup image in the backup storage device, the backup task IDs stored at the two ends are the same and the backup image IDs stored at the two ends are also the same.

It may be understood that the current backup is initiated by the storage device A, and therefore the task information is recorded as task information of the LUN A. If the backup is initiated by the storage device B, the dual-ended policy management apparatus B records the task information as backup task information of the LUN B.

Step 336: The backup apparatus A sends a request message to the dual-ended consistency snapshot apparatus A, to request to obtain differential information.

Step 338: The dual-ended consistency snapshot apparatus A determines the differential information, and returns the determined differential information to the backup apparatus A.

If it is the first time to create the snapshot, the dual-ended consistency snapshot apparatus A returns full bitmap information. If it is not the first time to create the snapshot, the dual-ended consistency snapshot apparatus A finds, based on parent snapshot information input by a backup module, bitmap information corresponding to a parent snapshot, finds, based on current snapshot information input by the backup module, bitmap information corresponding to the current snapshot, compares the bitmap information corresponding to the parent snapshot and the bitmap information corresponding to the current snapshot, and generates differential bitmap information, where the differential bitmap information is the differential information.

Step 340: The backup apparatus A requests data indicated by the differential information from the LUN A.

It may be understood that the data is data changed during two times of backup. For ease of description, the data is referred to as differential data below. The data indicated by the differential information can be found based on the current snapshot. For a specific process, refer to a common incremental snapshot backup technology. Details are not described herein.

Step 342: The LUN A returns the differential data.

Step 344: The backup apparatus A generates a storage path of the backup image, writes the obtained differential data into the path, and generates the backup image.

Likewise, when the dual-ended policy management apparatus B schedules the backup policy and generates a backup task, reference may be made to steps 312 to 344. Snapshots are created for the current backup task at the end B and the end A, and differential data is obtained, based on data of two adjacent snapshots, for backup. If the dual-ended consistency snapshot apparatus A returns the full bitmap information in step 338, in other words, it is the first time to perform backup, in the current backup, the dual-ended consistency snapshot apparatus B obtains differential bitmap information by comparing the snapshot of the previous full backup at the end A and a snapshot of the current backup.

In terms of the backup policy in the foregoing example, after the storage device A completes the backup for the LUN A, next backup is backup performed by the storage device B for the LUN B. In other words, the two storage devices take turns to perform backup. In addition, according to the solution in this embodiment of the present invention, during each backup, differential data is calculated based on a snapshot of a peer end during previous backup. Therefore, full backup data is stored in the backup storage device only once. The backup image stored in the backup storage device precisely reflects a change of data on the LUN A and the LUN B per hour, in other words, backup data is not repeated. Therefore, an amount of stored data is reduced.

In addition, the storage path of the backup image in the backup storage device may include a preset path and the WWN of the active-active LUNs. The preset path is /backup/ in the first backup policy. Specifically, the storage path is /backup/WWN. Because the LUN A and the LUN B have the same WWN, a backup image generated for the LUN A and a backup image generated for the LUN B are stored in a same path, to form a backup image 1, a backup image 2, a backup image 3, and the like shown in FIG. 1.

In addition, in this embodiment of the present invention, if the storage device A is faulty and consequently data cannot be written into the LUN A anymore, the storage device B may continue next backup based on previous backup in place of the storage device A. As described above, incremental backup is performed for the backup image stored in the backup storage device and there is no repeated data between backup images. To better improve efficiency, breakpoint information (the backup task ID, an offset address of data that is in the LUN A and that has been backed up, the backup image ID, and the like) may be stored in the backup storage device periodically (for example, each time 1G data is backed up or every other minute) in a process of obtaining the data from the LUN in step 342 and writing the data into the backup storage device in step 344. Therefore, when the storage device A is faulty, the storage device B can take over a backup task that is being performed by the storage device A before the storage device A is faulty, and implement resumable data transfer. A process of implementing the resumable data transfer includes the following steps.

Step 402: The dual-ended policy management apparatus B takes over the backup task that is being performed by the storage device A before the storage device A is faulty, and sends a request for creating a resumable data transfer task to the backup apparatus B.

In this step, the dual-ended policy management apparatus B can find the backup task of the storage device A for the LUN A in the stored task information of the LUN A in step 334, and include a backup task ID of the backup task in the request for creating a resumable data transfer task.

Step 404: The backup apparatus B sends a query request to the backup storage device, to query breakpoint information, where the query request includes the backup task ID.

Step 406: The backup storage device finds the breakpoint information in the backup storage device based on the backup task ID, and sends the breakpoint information to the backup apparatus B. The breakpoint information includes the backup task ID, the offset address of the data that is in the LUN A and that has been backed up, and the backup image ID.

Step 408: The backup apparatus B sends a request message to the dual-ended consistency snapshot apparatus B, to request to obtain differential information.

Step 410: The dual-ended consistency snapshot apparatus B determines the differential information, and returns the determined differential information to the backup apparatus B.

Step 412: The backup apparatus B requests data indicated by the differential information from the LUN B.

Step 414: The LUN B returns the differential data.

Step 416: The backup apparatus B continues, based on the breakpoint information, the backup that has not been completed for the LUN A.

In this step, because the breakpoint information includes the backup image ID and the offset address of the data that is in the LUN A and that has been backed up, the backup apparatus B can find a starting point of data that needs to be backed up and find a backup image in which the data is to be stored.

Step 418: Periodically store breakpoint information in the backup storage device.

With reference to FIG. 3-1 to FIG. 3-7, the following specifically describes how to find data consistency points in the embodiments of the present invention.

As described above, a LUN A in a storage device A and a LUN B in a storage device B are active-active LUNs. A process of writing four characters abcd into the LUN A and the LUN B by a host is used as an example to describe a process of finding data consistency points.

Step 3202: The host writes the character 'a' into the LUN A in the storage device A and writes the character 'b' into the LUN B in the storage device B.

Figures 1, 3:
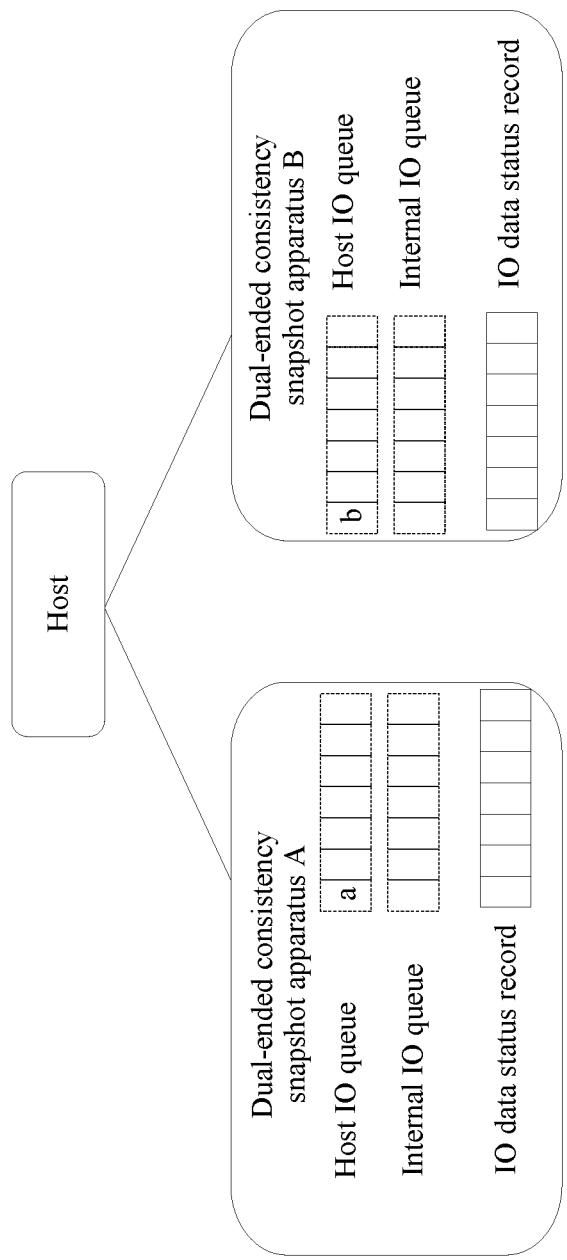
Figures 2, 3:
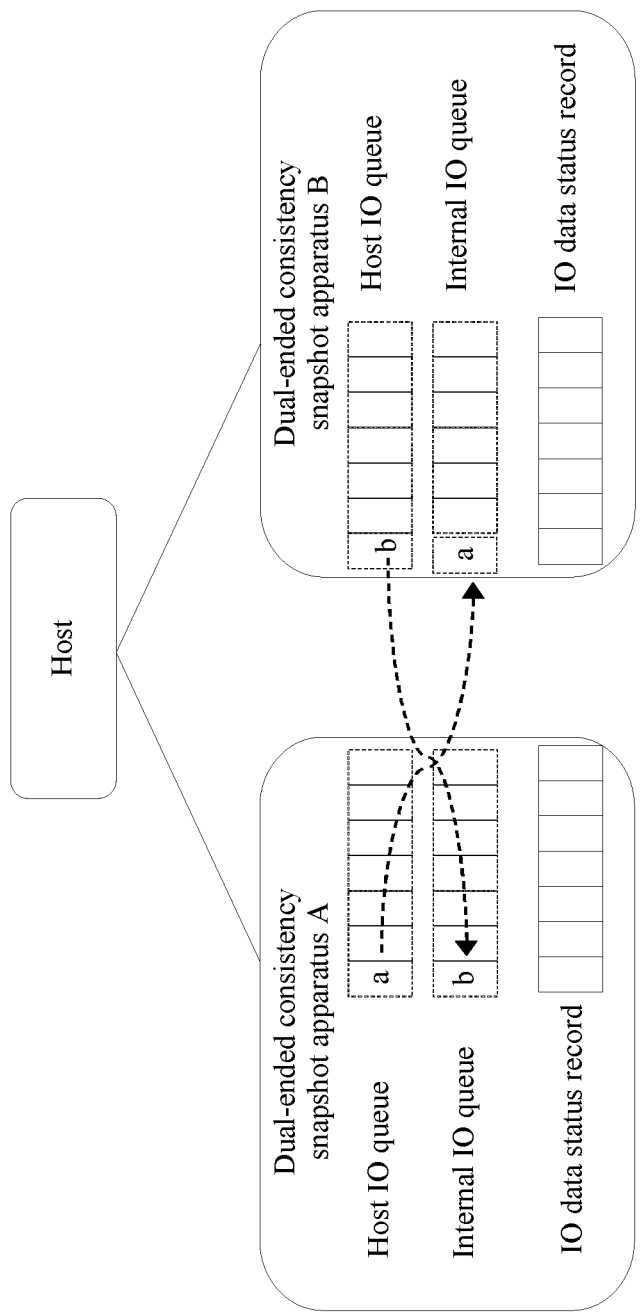
Figure 3:
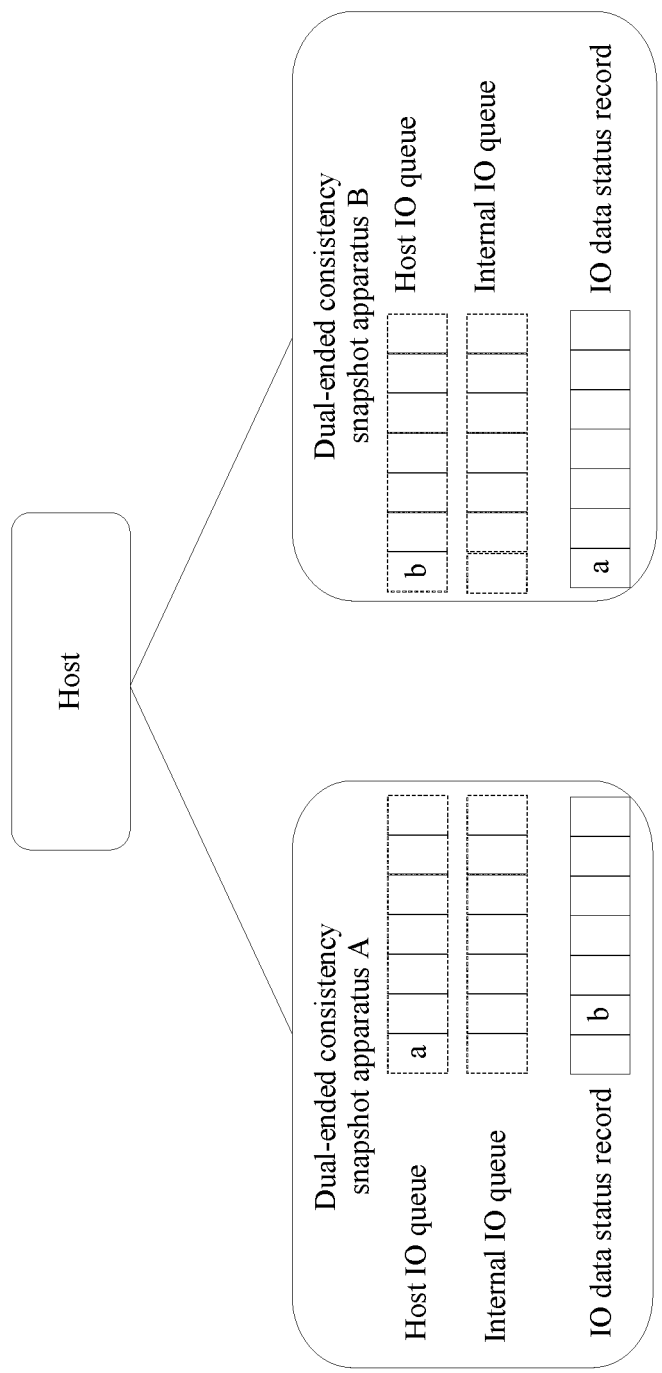

It may be understood that the host adds the character 'a' to an IO writing request and sends the IO writing request to the storage device A. Likewise, the host adds the character 'b' to an IO writing request and sends the IO writing request to the storage device B. As shown in FIG. 3-1, the IO writing request of the host first arrives at a dual-ended consistency snapshot apparatus A in the storage device A, and the dual-ended consistency snapshot apparatus A stores the IO request delivered by the host in a host IO queue. Likewise, a dual-ended consistency snapshot apparatus B in the storage device B stores the IO request delivered by the host in a host IO queue.

It should be noted that an IO data status record is null in this case.

The LUN A and the LUN B are active-active LUNs, and therefore need to synchronize data with each other.

Step 3204: Referring to FIG. 3-2, the dual-ended consistency snapshot apparatus A synchronizes the character 'a' received at the local end to a peer-end dual-ended consistency snapshot apparatus, namely, the dual-ended consistency snapshot apparatus B, and the dual-ended consistency snapshot apparatus B synchronizes the character 'b' received at the local end to a peer-end dual-ended consistency snapshot apparatus, namely, the dual-ended consistency snapshot apparatus A. For ease of distinction, the dual-ended consistency snapshot apparatus A sets a number for the character 'a' and stores the number in a memory. After the character 'a' is permanently stored in a disk and the IO data status record is updated, the number is deleted from the memory. The number includes an identification number of an initiate end and a sequence number of the IO request received by the initiate end. Herein, the number that is set for the character 'a' may be (A, 1), where A is an identifier of the initiate end (end A), and 1 represents the first IO request received from the host. Likewise, a number that is set for the character 'b' is (B, 1), where B is an identifier of the initiate end (end B), and 1 represents the first IO request received from the host. The initiate end is an initiate end that synchronizes data, namely, an end that directly receives data from the host. The number of the character 'b' is also pre-stored in a memory. After the character 'b' is permanently stored in a disk and the IO data status record is updated, the number is deleted from the memory.

Step 3206: Referring to FIG. 3-3, the dual-ended consistency snapshot apparatus A and the dual-ended consistency snapshot apparatus B respectively save, to storage, data carried in IO in internal IO queues at the local ends, and update the IO data status records after saving the data to storage. The IO data status record in the dual-ended consistency snapshot apparatus A includes [(B, 1)], and the IO data status record in the dual-ended consistency snapshot apparatus B includes [(A, 1)].

If the storage device is a storage array, when arriving at the array, written IO is first stored in a cache and then written into a hard disk according to a policy. A corresponding IO log is recorded for any IO that is written into the cache. Each IO log may include a sequence number of received IO, an offset location of the IO, a size of the IO, and data of the IO. An aging mechanism may be used for the IO log, in other words, an IO log whose existence exceeds specific duration is deleted. Actually, the host does not care when data written into the cache is really written into the hard disk. Therefore, in common implementation, written IO is recorded in an IO log, and this means that data has been saved to storage for the host. Therefore, in this embodiment of the present invention, saving to storage may be storing data in a cache of an array.

Figures 3, 4:
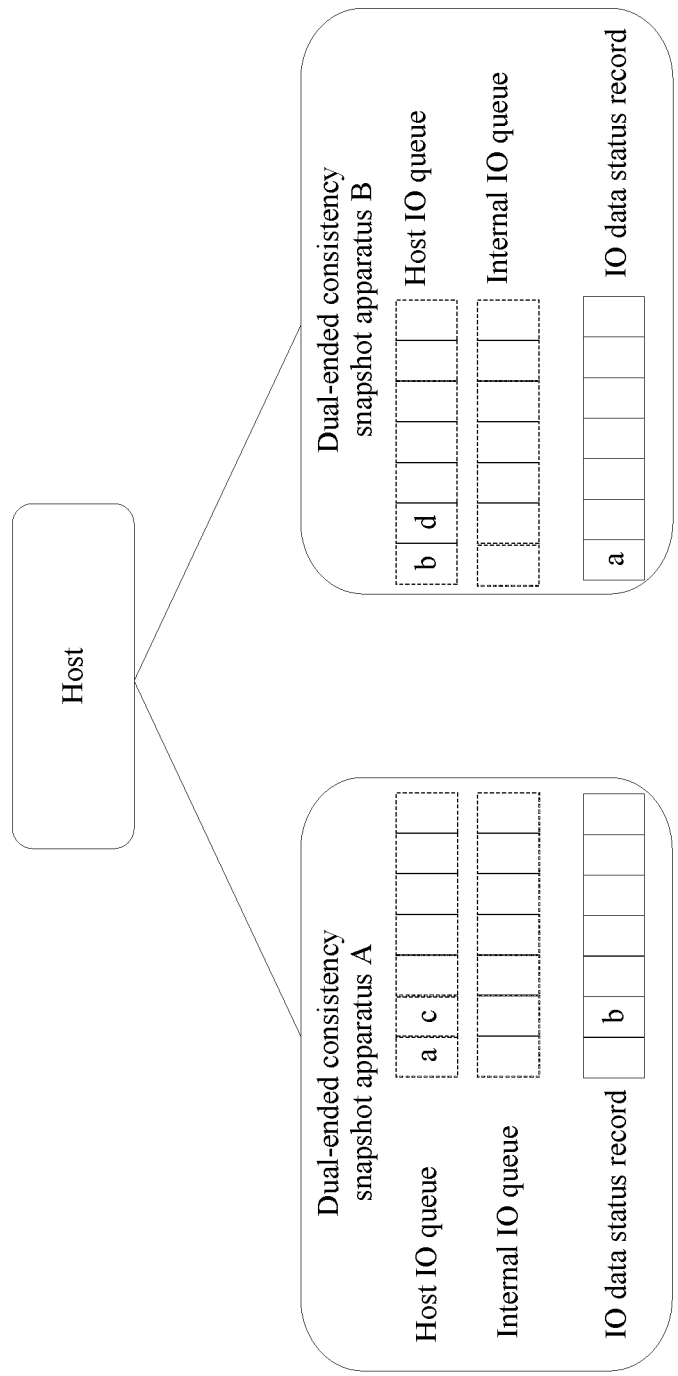

Step 3208: Referring to FIG. 3-4, the host writes the character 'c' into the LUN A in the storage device A and writes the character 'd' into the LUN B in the storage device B.

As described in step 3202, the dual-ended consistency snapshot apparatus A stores an IO writing request delivered by the host in the host IO queue. Likewise, the dual-ended consistency snapshot apparatus B stores an IO request delivered by the host in the host IO queue.

Figures 3, 4, 5:
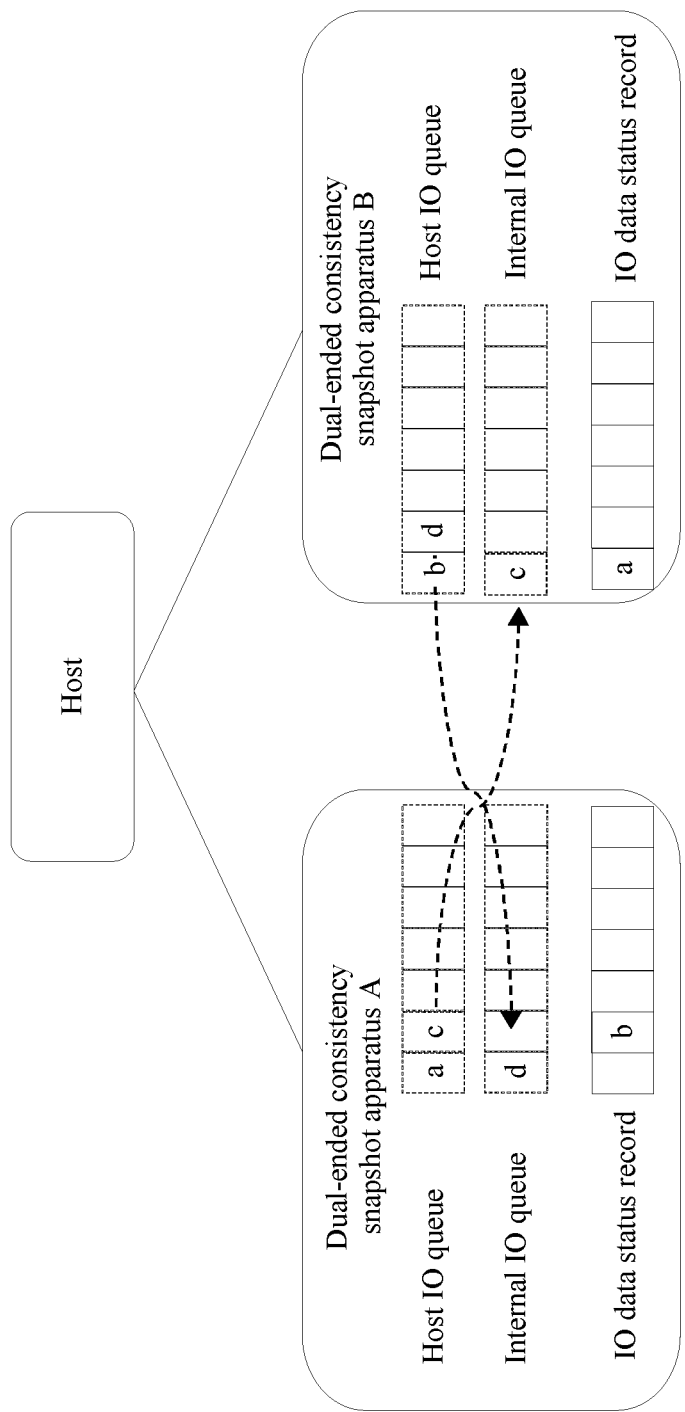
Figures 3, 4, 5, 6:
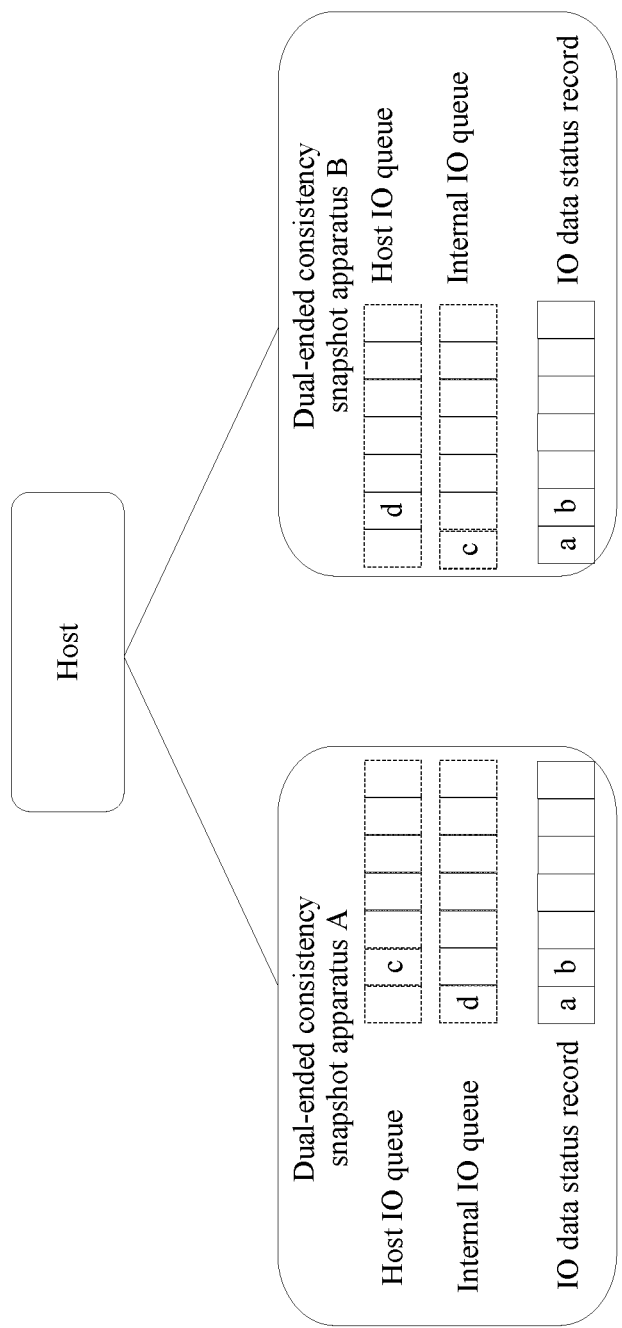
Figures 3, 4, 5, 6, 7:
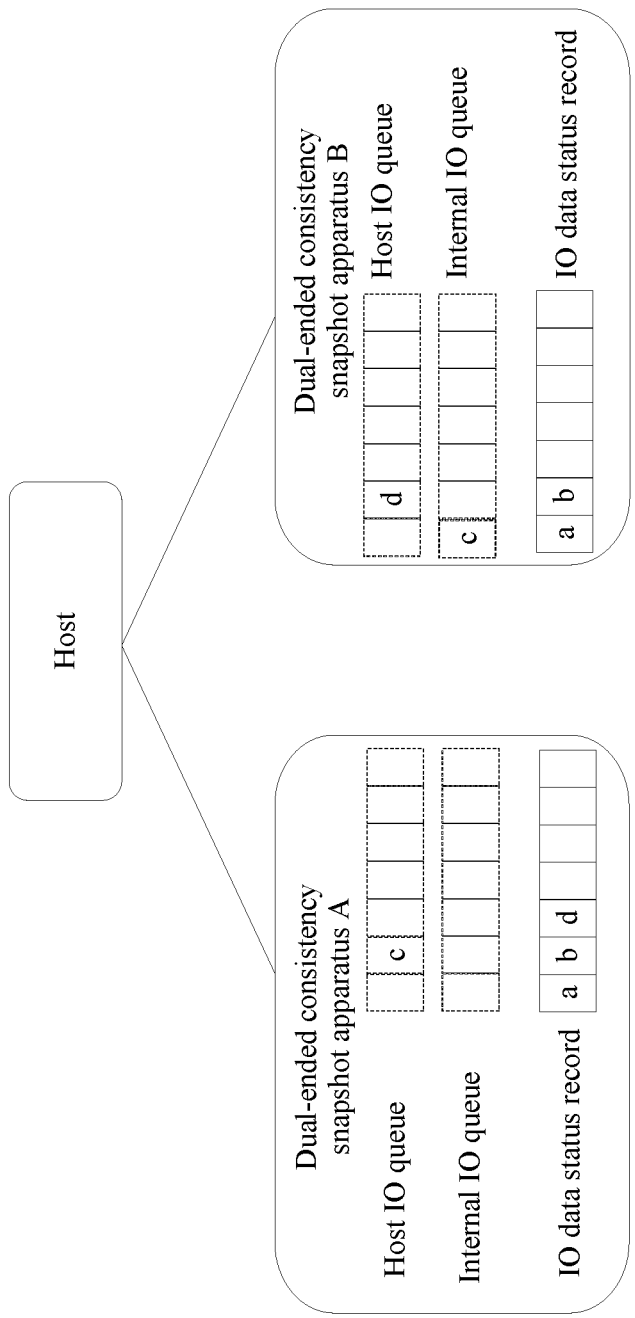

Step 3210: Referring to FIG. 3-5, the dual-ended consistency snapshot apparatus A synchronizes the character 'c' received at the local end to a peer-end dual-ended consistency snapshot apparatus, namely, the dual-ended consistency snapshot apparatus B, and the dual-ended consistency snapshot apparatus B synchronizes the character 'd' received at the local end to a peer-end dual-ended consistency snapshot apparatus, namely, the dual-ended consistency snapshot apparatus A.

A number (A, 2) is set for the character 'c', where A is the identifier of the initiate end (end A), and 2 represents the second IO request received from the host. Likewise, a number that is set for the character 'd' is (B, 2), where B is the identifier of the initiate end (end B), and 2 represents the second IO request received from the host.

It may be understood that the character 'c' and the character 'd' have not been saved to storage in this case, and therefore the recorded IO data status records are not updated.

Step 3212: The dual-ended policy management apparatus A invokes the backup policy of the local end; and if a condition of performing backup is met in this case, the dual-ended policy management apparatus A generates a backup task, and sends a backup creation request to a backup apparatus A.

After receiving the backup creation request, the backup apparatus A sends a consistency snapshot creation request message to the dual-ended consistency snapshot apparatus A.

By using the communication channel established in step 316, the dual-ended consistency snapshot apparatus A sends a data consistency point query message to the dual-ended consistency snapshot apparatus B, where the query message carries information about data that is saved to storage at the local end and that is recorded in the IO data status record at the local end. In this embodiment of the present invention, [(B, 1)] recorded in the IO data status record in this case is sent to the dual-ended consistency snapshot apparatus B.

The dual-ended consistency snapshot apparatus B searches the local end for a data consistency point based on the received IO data status record sent by the dual-ended consistency snapshot apparatus A. A specific process is as follows:

The dual-ended consistency snapshot apparatus B classifies, based on an initiate end, information in the IO data status record recorded at the local end and the IO data status record recorded at the peer end:

First, a record whose initiate end is the end A is searched:

A result of searching the IO data status record at the end A: null; and a result of searching the IO data status record at the end B: [(A, 1)].

No same point can be found. The result indicates that data received by the end A from the host has not been saved to storage locally, but has been saved to storage at the peer end (end B), in other words, data that has been saved to storage at both ends cannot be found.

Second, a record whose initiate end is the end B is searched:

A result of searching the IO data status record at the end A: [(B, 1)]; and a result of querying the IO data status record at the end B: null.

No same point can be found. The result indicates that data received by the end B from the host has not been saved to storage at the end B, but has been saved to storage at the end A, in other words, data that has been saved to storage at both ends cannot be found.

Specifically, when a snapshot is created, there is no differential information between the snapshot and a previous snapshot.

Step 3214: As shown in FIG. 3-6, the dual-ended consistency snapshot apparatus A and the dual-ended consistency snapshot apparatus B respectively save, to storage, data in the first IO writing requests in the host IO queues at the local ends.

In other words, the dual-ended consistency snapshot apparatus A writes the character 'a' into the disk, and the dual-ended consistency snapshot apparatus B writes the character 'b' into the disk.

After the data is saved to storage, the IO data status records at the local ends are refreshed.

The IO data status record in the dual-ended consistency snapshot apparatus A includes [(B, 1), (A, 1)], and the IO data status record in the dual-ended consistency snapshot apparatus B includes [(A, 1), (B, 1)].

If the condition of performing backup by the storage device A is met in this case, after the dual-ended consistency snapshot apparatus A receives a consistency snapshot creation request message sent by the storage device A, information that is in the IO data status record at the local end and that is included in a data consistency point query message sent to the dual-ended consistency snapshot apparatus B is [(B, 1), (A, 1)].

Likewise, data consistency points in this case are searched for by using the foregoing method for searching for a data consistency point. A specific process is as follows:

The dual-ended consistency snapshot apparatus B classifies, based on an initiate end, information in the IO data status record recorded at the local end and the IO data status record recorded at the peer end:

First, a record whose initiate end is the end A is searched:
A result of searching the IO data status record at the end A: [(A, 1)]; and a result of searching the IO data status record at the end B: [(A, 1)].
A data consistency point (A, 1) is found. The result indicates that data in the first IO writing request received by the end A from the host has been saved to storage locally (at the end A) and has also been saved to storage at the peer end (end B).

Second, a record whose initiate end is the end B is searched:
A result of searching the IO data status record at the end A: [(B, 1)]; and a result of searching the IO data status record at the end B: [(B, 1)].
A disk data point (B, 1) is found. The result indicates that data in the first IO writing request received by the end B from the host has been saved to storage locally and has also been saved to storage at the peer end (end A).

Step 3218: As shown in FIG. 3-7, for example, in this case, the dual-ended consistency snapshot apparatus A saves, to storage, data in an IO writing request in a memory IO queue at the local end.

In this case, the dual-ended consistency snapshot apparatus A refreshes the IO data status record at the local end. A refreshed IO data status record includes [(B, 1), (A, 1), (B, 2)].

If the condition of performing backup by the storage device A is met in this case, after the dual-ended consistency snapshot apparatus A receives a consistency snapshot creation request message sent by the storage device A, information that is in the IO data status record at the local end and that is included in a data consistency point query message sent to the dual-ended consistency snapshot apparatus B is [(B, 1), (A, 1), (B, 2)].

Likewise, data consistency points in this case are searched for by using the foregoing method for searching for a data consistency point. A specific process is as follows:

The dual-ended consistency snapshot apparatus B classifies, based on an initiate end, information in the IO data status record recorded at the local end and the IO data status record recorded at the peer end:

First, a record whose initiate end is the end A is searched:
A result of searching the IO data status record at the end A: [(A, 1)]; and a result of searching the IO data status record at the end B: [(A, 1)].
A data consistency point (A, 1) is found. The result indicates that data in the first IO writing request received by the end A from the host has been saved to storage locally (at the end A) and has also been saved to storage at the peer end (end B).

Second, a record whose initiate end is the end B is searched:
A result of searching the IO data status record at the end A: [(B, 1)]; and a result of searching the IO data status record at the end B: [(B, 1)].
A data consistency point is found. The result indicates that data in the first IO writing request received by the end B from the host has been saved to storage locally and has also been saved to storage at the peer end (end A).

Step 3220: The dual-ended consistency snapshot apparatus B stores the IO data status record, obtains an IO data status record of data of the LUN B, compares the two IO data status records, finds the data consistency points, generates information about the data consistency points, creates a snapshot based on the data consistency points, and generates a differential IO data status record.

After the data consistency points are determined, a process of creating the snapshot based on the data consistency points in step 3220 includes:
determining that (A, 1) and (B, 1) belong to the current snapshot based on the data consistency points; and
creating a snapshot volume, finding, based on the IO sequence number, corresponding data in logs stored in the storage device A and the storage device B, and writing the corresponding data into the snapshot volume, where if a part of the data is deleted due to log aging, the data in the logs is incomplete, and therefore, if not all the data can be found in the logs, the hard disk of the storage device A or the storage device B needs to be searched for the corresponding data.

In the foregoing embodiment, the data consistency points need to be determined by using the IO data status records at the local end and the peer end, to ensure that snapshot data at the two ends is consistent. In this implementation, existing IO processing is not affected, and a user does not aware too. However, this manner is relatively complex.

Therefore, an embodiment of the present invention further provides another simple manner to ensure that snapshot data at the two ends is consistent. The method includes the following steps.

Steps 502 to 514 are consistent with steps 302 to 314.

Step 516: After receiving the consistency snapshot creation request sent by the backup apparatus, the dual-ended consistency snapshot apparatus A hangs IO from the host, and saves, to storage, previous IO in a host IO queue and IO in an internal IO queue at the local end.

The dual-ended consistency snapshot apparatus A finds, based on the active-active relationship, the dual-ended consistency snapshot apparatus B corresponding to the LUN B, and establishes a communication channel with the dual-ended consistency snapshot apparatus B. The foregoing notification is sent by using the communication channel. Hanging the IO from the host means that the IO received from the host is placed in a cache and is not processed temporarily, and includes skipping placing the IO in the host IO queue. If hanging the IO from the host causes cache space to be used up, the storage device may report an error to the host, and as a result, the host does not deliver IO anymore.

Step 518: After hanging the IO from the host, the dual-ended consistency snapshot apparatus A sends a notification message to the dual-ended consistency snapshot apparatus B, to notify the peer end of hanging IO from the host and creating a snapshot.

Step 520: After receiving the notification, the dual-ended consistency snapshot apparatus B hangs IO from the host, saves, to storage, previous IO in a host IO queue and IO in an internal IO queue at the local end, and creates a snapshot after saving all data to storage.

Step 522: The dual-ended consistency snapshot apparatus B returns a snapshot ID of the LUN B to the dual-ended consistency snapshot apparatus A.

Step 524: After receiving the snapshot ID of the LUN B that is returned by the dual-ended consistency snapshot apparatus B, the dual-ended consistency snapshot apparatus A creates a snapshot of the LUN A at the local end, and generates differential tracking information.

Steps 526 to 544 are the same as steps 326 to 344. Details are not described again.

In this embodiment of the present invention, according to the very simple and efficient method, when the storage device A performs backup, data that has been saved to storage in the storage device A is consistent with data that has been saved to storage in the storage device B, so that both ends perform continuous backup in the backup storage device. This is convenient for one party to take over a backup task or other work of the other party when a fault occurs.

An embodiment of the present invention further provides a data backup method. The method is applied to the backup storage system in FIG. 2. As shown in FIG. 2, a backup gateway is disposed between the storage device A and the storage device B and the backup storage device. The backup gateway is configured to implement functions of the foregoing backup apparatus and dual-ended policy management device apparatus.

After the backup gateway receives a backup policy creation request sent by a backup administrator, the backup gateway finds that LUNs that need to be backed up are configured to be in an active-active relationship, and then configures a dual-ended backup policy for the active-active LUNs. An example in which a backup relationship is set between the LUN A and the LUN B in the foregoing embodiments is still used. Herein, the backup gateway does not distinguish between a local end and a peer end. Instead, the backup gateway separately creates a first backup policy for the LUN A and a second backup policy for the LUN B; and invokes, according to the first backup policy, the storage device A to perform backup for the LUN A, and invokes the second backup policy to perform backup for the LUN B.

Because neither a backup apparatus nor a dual-ended policy management apparatus is separately disposed in the storage device A and the storage device B, the foregoing steps in which the dual-ended policy management apparatus A interacts with the dual-ended policy management apparatus B, such as step 306, and step 308, do not exist in this embodiment.

The foregoing local end and peer end are relative concepts. When an execution body is the storage device A or a component in the storage device A, the local end is the end A, and the peer end is the end B. Contrarily, when an execution body is the storage device B or a component in the storage device B, the local end is the end B, and the peer end is the end A. In addition, the saving to storage is storing data in a disk, and the disk is a disk used for permanent storage and may include an SSD, an HDD, and the like.

A person of ordinary skill in the art will understand that each aspect of the present invention or a possible implementation of each aspect may be specifically implemented as a system, a method, or a computer program product. Therefore, each aspect of the present invention or the possible implementation of each aspect may use a form of hardware only embodiments, software only embodiments (including firmware, resident software, and the like), or embodiments with a combination of software and hardware, which are uniformly referred to as a "circuit", "module", or "system" herein. In addition, each aspect of the present invention or the possible implementation of each aspect may use a form of a computer program product. The computer program product is computer-readable program code stored in a computer-readable medium.

The computer-readable medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read-only memory (EPROM), and an optical disc.

A processor in a computer reads the computer-readable program code stored in the computer-readable medium, so that the processor can perform a function and an action specified in each step or a combination of steps in a flowchart.

The computer-readable program code may be completely executed on a user computer, or may be partially executed on a user computer as a standalone software package, or may be partially executed on a user computer and partially executed on a remote computer, or may be completely executed on a remote computer or a server. It should also be noted that, in some alternative implementation solutions, a function specified in each step in the flowcharts or in each block in the block diagrams may not occur in the illustrated order. For example, depending on a related function, two consecutively shown steps or two consecutively shown blocks may actually be executed simultaneously roughly, or these blocks may sometimes be executed in reverse order.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person of ordinary skill in the art may use different methods to implement the described functions for each particular application, but it should not be considered that the implementation goes beyond the scope of the present invention.

The foregoing descriptions are merely specific implementations of the present invention, but are not intended to limit the protection scope of the present invention. Any variation or replacement readily figured out by a person of ordinary skill in the art within the technical scope disclosed in the present invention shall fall within the protection scope of the present invention. Therefore, the protection scope of the present invention shall be subject to the protection scope of the claims.

What is claimed is:

1. A data backup method performed in a storage system having a first storage device comprising a first logical unit number (LUN), a second storage device comprising a second LUN in an active-active relationship with the first LUN, and a backup storage device, the method comprising:

setting, by the first storage device, a dual-ended backup policy, wherein the dual-ended backup policy comprises a first backup policy to be performed by the first storage device for the first LUN and a second backup policy to be performed by the second storage device for the second LUN, wherein the first storage device initiates backup for the first LUN according to the first backup policy;

sending, by the first storage device, a request message to the second storage device, wherein the request message comprises an input/output (IO) data status record of a first LUN and the IO data status record records IO writing logs regarding IO saved to storage in the first LUN;

obtaining, by the second storage device, in response to receiving the request message sent by the first storage device, information regarding data consistency points based on the IO data status record of the first LUN and an IO data status record of the second LUN stored in the second storage device, wherein the IO data status record of the second LUN records IO writing logs regarding IO saved to storage in the second LUN, wherein the data consistency points indicate IO that has been saved to both the storage in the first LUN and the storage in the second LUN;

receiving, by the first storage device from the second storage device, the information regarding the data consistency points;

creating, by the first storage device, a snapshot for the first LUN based on the data consistency points;

providing, by the first storage device, differential data between the created snapshot and a previous snapshot; and writing the differential data into a backup image in the backup storage device.

2. The method according to claim 1, wherein a path of the backup image in the backup storage device comprises a preset path and a world wide name (WWN) of the first LUN.

3. The method according to claim 1, wherein the IO data status record comprises an identifier of an initiate end and a sequence number of IO received by the initiate end from a host, and wherein the step of obtaining information of the data consistency points comprises:

determining, by the second storage device based on the IO data status record of the first LUN and the IO data status record of the second LUN, IO that has been saved to storage in both the first storage device and the second storage device in IO written into the first LUN by the host, and using a latest sequence number of the determined IO as a first data consistency point; and determining, by the second storage device based on the IO data status record of the first LUN and the IO data status record of the second LUN, IO that has been saved to storage in both the second storage device and the first storage device in IO written into the second LUN by the host, and using a latest sequence number of the determined IO as a second data consistency point, wherein the data consistency points comprise the first data consistency point and the second data consistency point.

4. The method according to claim 3, further comprising: creating, by the second storage device, a snapshot based on the data consistency points.

5. The method according to claim 4, wherein the step of creating the snapshot based on the data consistency points comprises:

determining, based on the first data consistency point and the second data consistency point, a sequence number of written request comprised in the snapshot;

creating a volume of the snapshot;

searching the IO data status record of the first LUN and the IO data status record of the second LUN for corresponding data based on the sequence number of the written request; and writing found corresponding data into the volume of the snapshot.

6. The method according to claim 5, further comprising:
in response to the corresponding data being not found in an IO writing log of the first LUN or an IO writing log of the second LUN, searching the first storage device or the second storage device to locate the corresponding data, and writing the located corresponding data into the volume of the snapshot.

7. The method according to claim 1, further comprising:
sending, by the first storage device, the dual-ended backup policy to the second storage device; and performing, by the second storage device, the second backup policy when detecting that the first storage device is normal, or the first backup policy in place of the first storage device in response to detecting that the first storage device is faulty.

8. The method according to claim 7, further comprising:
periodically sending, by the first storage device, breakpoint information to the backup storage device in a process of obtaining the differential data between the current snapshot and the previous snapshot and writing the differential data into the backup image, wherein the breakpoint information comprises a backup task ID, an offset address of data that is in the first LUN and that has been backed up, and a backup image ID; and wherein the step of performing the first backup policy in place of the first storage device comprises:

finding, by the second storage device based on peer-end task information that is recorded at the local end, a backup task ID of backup that is being performed by the first storage device before the first storage device is faulty; and finding breakpoint information in the backup storage device based on the backup task ID, and continuing to obtain, based on the breakpoint information, differential information for backup.

9. A data backup method performed in a storage system having a first storage device comprising a first logical unit number (LUN), a second storage device comprising a second LUN in an active-active relationship with the first LUN of the first storage device, and a backup storage device, the method comprising:

setting, by the first storage device, a dual-ended backup policy, wherein the dual-ended backup policy comprises a first backup policy to be performed by the first storage device for the first LUN and a second backup policy to be performed by the second storage device for the second LUN, wherein the first storage device initiates backup for the first LUN according to the first backup policy;

hanging, by the first storage device, an input/output (IO) request from a host, and writing, into a hard disk, write request previously cached in the first storage device, wherein hanging the IO request from the host means that the IO received from the host is placed in a cache and is not processed temporarily;

sending, by the first storage device, a notification message to the second storage device in response to hanging the IO from the host, wherein the notification message is used to instruct the second storage device to hang IO from the host and create a snapshot for the second LUN; and receiving, by the first storage device, a snapshot identifier for the second LUN returned by the second storage device, creating a snapshot for the first LUN, creating a backup image of the current backup in the backup storage device, and writing differential data between the created snapshot for the first LUN and a previous snapshot into the backup image.

10. The method according to claim 9, further comprising:
after receiving the notification message, hanging, by the second storage device, IO of the local end from the host, and saving to storage the write request previously cached in the second storage device.

11. A storage device comprising:
a memory storing executable instructions;
a processor configured to executable the executable instructions to perform operations of:
setting a dual-ended backup policy, wherein the dual-ended backup policy comprises a first backup policy to be performed by the storage device for a first logical unit number (LUN) of the storage device and a second backup policy to be performed by a second storage device for a second LUN of the second storage device, wherein the first storage device initiates backup for the first LUN according to the first backup policy;
sending, to the second storage device, a request message, wherein the request message comprises an IO data status record of a first LUN of the storage device, and the IO data status record records IO saved to storage in the first LUN, wherein the second LUN is in an active-to-active relationship with the first LUN;
receiving, from the second storage device, a response message comprising information regarding the data consistency points, wherein the data consistency points indicate IO that has been saved to both the storage in the first LUN and the storage in the second LUN;
creating a snapshot for the first LUN based on the data consistency points; and
providing differential data between the created snapshot and a previous snapshot, wherein the differential data is written into a backup image for the created snapshot in the backup storage device.

12. A storage system comprising:
a first storage device having a first logical unit number (LUN);
a second storage device having a second LUN, wherein the first LUN and the second LUN are in an active-active relationship; and
a backup storage device;
wherein the first storage device is coupled to the second storage device and the backup storage device, respectively;
wherein the first storage device is configured to perform operations of:
setting a dual-ended backup policy, wherein the dual-ended backup policy comprises a first backup policy to be performed by the first storage device for the first LUN and a second backup policy to be performed by the second storage device for the second LUN, wherein the first storage device initiates backup for the first LUN according to the first backup policy;
sending, to the second storage device, a request message, wherein the request message comprises an IO data status record of a first LUN of the storage, and the IO data status record records IO saved to storage in the first LUN;
receiving, from the second storage device, a response message comprising information regarding the data consistency points, wherein the data consistency points indicate IO that has been saved to both the storage in the first LUN and the storage in the second LUN;
creating a snapshot for the first LUN based on the data consistency points;
providing differential data between the created snapshot and a previous snapshot, wherein the differential data is written into a backup image for the created snapshot in the backup storage device;
wherein the second storage device is configured to perform operations of:
receiving the request message from the first storage device;
obtaining, in response to the request message, information regarding the data consistency points based on the IO data status record of the first LUN and an IO data status record of the second LUN stored in the second storage device, wherein the IO data status record of the second LUN records IO writing logs regarding IO saved to storage in the second LUN; and
sending the information regarding the data consistency points to the first storage device.

13. The storage system according to claim 12, wherein the second storage device is further configured to perform operations of:
determining based on the IO data status record of the first LUN and the IO data status record of the second LUN, IO that has been saved to storage in both the first storage device and the second storage device in IO written into the first LUN by the host;
using a latest sequence number of the determined IO as a first data consistency point;
determining based on the IO data status record of the first LUN and the IO data status record of the second LUN, IO that has been saved to storage in both the second storage device and the first storage device in IO written into the second LUN by the host; and
using a latest sequence number of the determined IO as a second data consistency point, wherein the data consistency points comprise the first data consistency point and the second data consistency point.

14. The storage system according to claim 13, wherein the second storage device is further configured to perform an operations of:
creating a snapshot based on the data consistency points.

15. The storage system according to claim 14, wherein the second storage device is further configured to perform operations of:
determining, based on the first data consistency point and the second data consistency point, a sequence number of write request comprised in the snapshot;
creating a volume of the snapshot;
searching the IO data status record of the first LUN and the IO data status record of the second LUN for corresponding data based on the sequence number of the write request; and
writing the found data into the volume of the snapshot.

16. The storage system according to claim 12, wherein the first second storage device is further configured to perform an operation of:
sending the dual-ended backup policy to the second storage device, and
wherein the second storage device is further configured to perform an operations of:
performing the second backup policy in response to detecting that the first storage device is normal, or the first backup policy in place of the first storage device when detecting that the first storage device is faulty.

17. The storage system according to claim 16, wherein the first storage device is further configured to perform operations of:

periodically sending breakpoint information to the backup storage device in a process of obtaining the differential data between the created snapshot and the previous snapshot and writing the differential data into the backup image, wherein the breakpoint information comprises a backup task ID, an offset address of data that is in the first LUN and that has been backed up, and a backup image ID; and wherein the second storage device is further configured to perform operations of:

finding based on peer-end task information that is recorded at the local end, a backup task ID of backup that is being performed by the first storage device before the first storage device is faulty; and finding breakpoint information in the backup storage device based on the backup task ID, and continuing to obtain, based on the breakpoint information, differential information for backup.

\* \* \* \* \*